(12) United States Patent
Zhang et al.

(10) Patent No.: US 11,308,138 B2
(45) Date of Patent: Apr. 19, 2022

(54) DANGER WARNING METHOD FOR VEHICLE, DANGER WARNING DEVICE FOR VEHICLE, AND MEDIUM

(71) Applicant: BEIJING BAIDU NETCOM SCIENCE AND TECHNOLOGY CO., LTD., Beijing (CN)

(72) Inventors: Zhuhua Zhang, Beijing (CN); Xing Hu, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 192 days.

(21) Appl. No.: 16/722,231

(22) Filed: Dec. 20, 2019

(65) Prior Publication Data

US 2020/0210461 A1      Jul. 2, 2020

(30) Foreign Application Priority Data

Dec. 28, 2018   (CN) .......................... 201811654598.0

(51) Int. Cl.
*G06F 16/29* (2019.01)
*B60W 50/14* (2020.01)

(52) U.S. Cl.
CPC ............. *G06F 16/29* (2019.01); *B60W 50/14* (2013.01); *B60W 2050/143* (2013.01); *B60W 2050/146* (2013.01)

(58) Field of Classification Search
CPC . G06F 16/29; B60W 50/14; B60W 2050/143; B60W 2050/146;

(Continued)

(56) References Cited

U.S. PATENT DOCUMENTS

| 6,084,510 A | 7/2000 | Lemelson et al. |
| 2014/0070960 A1 | 3/2014 | Sung et al. |

(Continued)

FOREIGN PATENT DOCUMENTS

| CN | 107924617 A | 4/2018 |
| CN | 108182817 A | 6/2018 |

(Continued)

OTHER PUBLICATIONS

Japanese Patent Application No. 2019-234822, Office Action dated Feb. 2, 2021, 4 pages.

(Continued)

*Primary Examiner* — Nabil H Syed
*Assistant Examiner* — Cal J Eustaquio
(74) *Attorney, Agent, or Firm* — Lathrop GPM LLP

(57) ABSTRACT

Embodiments of the present disclosure provide a danger warning method for a vehicle, a danger warning device for a vehicle, and medium. The method includes: receiving a plurality of sensing data sets from a plurality of environmental monitoring devices that monitor a plurality of geographical ranges; determining a danger degree of respective object in the plurality of geographical ranges with respect to the vehicle based on the plurality of sensing data sets; and providing a danger warning instruction to the vehicle in response to determining that the danger degree is greater than a degree threshold. Each of the plurality of sensing data sets includes relevant information about objects in the corresponding geographical range, and the plurality of environmental monitoring devices are arranged away from the vehicle. The danger degree is configured to indicate a possibility that the object will endanger safe driving of the vehicle.

17 Claims, 3 Drawing Sheets

(58) Field of Classification Search
CPC .......... G01S 2013/9316; G01S 13/878; G01S 13/91; G08G 1/0133; G08G 1/0116; G08G 1/164; G08G 1/166; G08G 1/165; G08G 1/0108; G08B 21/02
See application file for complete search history.

(56) References Cited

U.S. PATENT DOCUMENTS

| | | |
|---|---|---|
| 2016/0097849 A1 | 4/2016 | Nichols et al. |
| 2018/0089997 A1 | 3/2018 | Ho et al. |

FOREIGN PATENT DOCUMENTS

| | | |
|---|---|---|
| CN | 108352116 A | 7/2018 |
| EP | 3407257 A1 | 11/2018 |
| JP | H0652485 A | 2/1994 |
| JP | 2001103451 A | 4/2001 |
| JP | 2002260192 A | 9/2002 |
| JP | 2006318446 A | 11/2006 |
| JP | 2009098956 A | 5/2009 |
| JP | 2011061604 A | 3/2011 |
| JP | 2011180873 A | 9/2011 |
| JP | 2013168178 A | 8/2013 |
| JP | 2016139392 A | 8/2016 |
| JP | 2018084860 A | 5/2018 |
| WO | WO 2018158642 A1 | 9/2018 |
| WO | WO 2018198239 A | 11/2018 |

OTHER PUBLICATIONS

Japanese Patent Application No. 2019-234822, English translation of Office Action dated Feb. 2, 2021, 4 pages.
Chinese Patent Application No. 201811654598.0, Office Action dated Nov. 3, 2020, 10 pages.
Chinese Patent Application No. 201811654598.0, English translation of Office Action dated Nov. 3, 2020, 9 pages.
European Patent Application No. 19216759.1, extended Search and Opinion dated May 20, 2020, 7 pages.

DANGER WARNING METHOD FOR VEHICLE, DANGER WARNING DEVICE FOR VEHICLE, AND MEDIUM

CROSS-REFERENCE TO RELATED APPLICATIONS

This application claims priority to and benefits of Chinese Patent Application No. 201811654598.0, filed with the National Intellectual Property Administration of P. R. China on Dec. 28, 2018, the entire contents of which are incorporated herein by reference.

TECHNICAL FIELD

The present disclosure relates to the field of safety driving assist technology, and more particularly, to a danger warning method for a vehicle, a danger warning device for a vehicle, a device, and a computer readable storage medium.

BACKGROUND

The driving safety of vehicles is always expected to be fully guaranteed. During traveling, the vehicle may encounter a variety of conditions in the surrounding environment that may threaten safe driving, and provision of danger warning for the vehicle may help to ensure traffic safety and improve traffic efficiency.

SUMMARY

Embodiments of a first aspect of the present disclosure provide a danger warning method for a vehicle. The method includes: receiving a plurality of sensing data sets from a plurality of environmental monitoring devices that monitor a plurality of geographical ranges; determining a danger degree of respective object in the plurality of geographical ranges with respect to the vehicle based on the plurality of sensing data sets; and providing a danger warning instruction to the vehicle in response to determining that the danger degree is greater than a degree threshold. Each of the plurality of sensing data sets includes relevant information about objects in the corresponding geographical range, and the plurality of environmental monitoring devices are arranged away from the vehicle. The danger degree being configured to indicate a possibility that the object will endanger safe driving of the vehicle.

Embodiments of a second aspect of the present disclosure provide a computer readable storage medium having stored thereon a computer program that, when executed by a processor, cause the method according to embodiments of the present disclosure to be implemented.

The content described in the summary is not intended to limit the key or important features of the present disclosure, or the scope of the present disclosure. Other features of the present disclosure will be readily understood by the following description.

BRIEF DESCRIPTION OF THE DRAWINGS

These and other aspects and advantages of embodiments of the present disclosure will become apparent and more readily appreciated from the following descriptions made with reference to the drawings. In the drawings, the same or similar reference numerals indicate the same or similar elements, in which.

DETAILED DESCRIPTION

Figure 1:
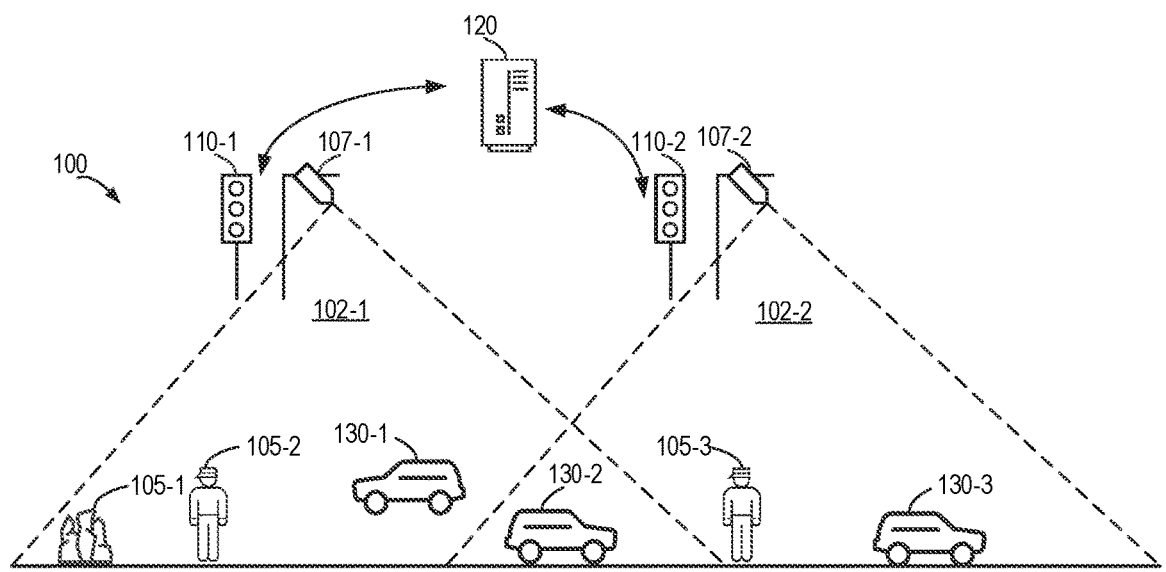
FIG. 1 is a schematic diagram of an exemplary environment for implementing an embodiment of the present disclosure.

Embodiments of the present disclosure will be described in more detail below with reference to the accompanying drawings. Although certain embodiments of the present disclosure are shown in the drawings, it is understood that, the present disclosure may be embodied in various forms, and should not be construed as being limited to the embodiments herein. Instead, the embodiments are disclosed to provide a more complete and clear understanding of the present disclosure. The drawings and embodiments of the present disclosure are for illustrative purpose only and are not intended to limit the scope of the present disclosure.

In the description of embodiments of the present disclosure, the term "including" and the like are to be understood as open inclusion, i.e., "including but not limited to". The term "based on" should be understood as "based at least in part". The term "one embodiment" or "an embodiment" should be understood as "at least one embodiment". The terms "first", "second" and the like may refer to different or identical objects. Other explicit or implicit definitions may also be included below.

For the vehicle in the autonomous driving mode, early detection of security threats may enable the vehicle to adjust traveling control accordingly, for the vehicle driven by a driver in the non-autonomous driving mode, early warning of danger may help the driver take timely action to avoid traffic accidents.

As a brand-new technology, the Intelligent Transportation System (ITS), by adopting advanced science and technology and comprehensively considering relevant factors such as roads, traffic, people and environment, can realize intelligent traffic management and bring possibility for solving road traffic problems. Meanwhile, as the deployment of network communication and improvement of availability, instant communication with vehicles, such as communication facilities on the vehicles, becomes possible. In such a scenario, it is expected to provide timely and accurate danger warnings for vehicles.

It is beneficial to provide danger warning for the vehicle, especially to help ensure traffic safety and improve traffic efficiency. There are methods for providing danger warning, for example, some vehicles are provided with an advanced driver assistance system (ADAS). Based on the various sensors installed on the vehicle, ambient environment can be detected, data can be acquired, the object can be recognized, and analysis can be performed based on map data acquired by such as a navigator, so as to alert the driver of possible dangers. For the vehicle with autonomous driving capabilities, sensing devices such as a camera, a laser radar, a millimeter wave radar may be provided on the vehicle, to sense the surrounding environment of the vehicle. On the other hand, the developed vehicle-to-everything (V2X) communication technology can enable vehicles to communicate via, for example, a dedicated short-range communication (DSRC) link. The vehicle can acquire its vehicle data, and broadcast the acquired data to the surrounding vehicles through V2X communication technology. After data broadcast by other vehicles is obtained, each vehicle can determine traveling states and abnormal conditions of other vehicles, when it is determined that other vehicles are abnormal or may affect the traveling of the vehicle, the vehicle may generate warning information to alert the driver.

In the solution that relies on the sensors or the sensing devices to sense the ambient environment, the accuracy of sensing depends on the sensing capability (which may include the sensing accuracy and the sensing range) of the sensors, and high sensing capabilities of the sensor usually lead to high cost. Incorrect sensing may lead to problems of false warning or missing warning, bringing security risks. In addition, limited by the positioning and height of the vehicle, the on-board sensing device may not be able to accurately obtain the surrounding environment in real time due to limited positioning directions or obstruction by other objects. Furthermore, in the solution that relies on V2X communication technology, not all vehicles traveling on the road may support V2X communication or allow broadcasting of vehicle data, and there may be other objects, such as people, animals, or other obstacles, in the traveling environment that do not have communication capabilities. When the danger warning is identified based only on real-time communication between vehicles, it will not be able to fully consider all kinds of objects that may pose a potential threat to the driving safety of the vehicle.

Embodiments of the present disclosure provide a danger warning method for a vehicle, a plurality of environmental monitoring devices are configured to monitor corresponding geographical ranges and provide relevant information about objects in the plurality of geographical ranges. Based on the information provided, a possibility that the objects in the plurality of geographical ranges will endanger safe driving of the vehicle may be determined, when the possibility is high, a danger warning can be provided to the vehicle. Therefore, by comprehensively considering the object-relevant information provided by the plurality of external environmental monitoring devices, a wider range of threats to the driving safety of the vehicle can be considered, and the accuracy and timeliness of danger warning can be improved.

Embodiments of the present disclosure will be described in detail below with reference to the accompanying drawings. FIG. 1 is a schematic diagram of an exemplary traffic environment 100 for implementing various embodiments of the present disclosure. In the traffic environment 100, one or more traffic tools 130-1, 130-2 and 130-3 are included. For ease of description, the traffic tools 130-1, 130-2 and 130-3 are collectively referred to as a traffic tool 130. The traffic tool may refer to any type of tool capable of carrying people and/or objects and being movable. In the example of FIG. 1, the traffic tool 130 is illustrated as a vehicle (the vehicle 130). The vehicle herein may be a motor vehicle or a non-motor vehicle, examples of which include, but are not limited to, cars, sedans, trucks, buses, electric cars, motorcycles, bicycles, and the like. The vehicle is merely an example. Embodiments of the present disclosure may also be applicable to other traffic tools such as ships, trains, airplanes, and the like.

The one or more vehicles 130 in the environment 100 may have self-driving capabilities, also known as unmanned vehicles, and may not have self-driving capabilities, which are controlled by the driver. The integrated device or removable device in the one or more vehicles 130 may communicate with other devices based on one or more communication technologies, such as communicating with other vehicles 130 or devices other than vehicles through V2X communication technology. The vehicle 130 may also be equipped with a positioning device to determine its position, the positioning of the positioning device may be implemented based on any of the technologies, including global positioning system (GPS), global orbiting navigational satellite system (GLONASS), Beidou navigational satellite system, Galileo, Quasi-Zenith Satellite System (QASS), base station positioning, Wi-Fi positioning, etc.

In addition to the vehicle 130, the environment 100 may also include objects 105-1, 105-2 and 105-3 (collectively referred to as a vehicle exterior object 105), and the vehicle exterior object may be physical entities such as stones, people, animals, roadside traffic facilities. Moreover, the environment 100 may further include a plurality of environmental monitoring devices 110-1, 110-2 (collectively referred to as an environmental monitoring device 110). The environmental monitoring device 110 is arranged outside the vehicle 130 and is located away from the vehicle 130, for example, the environmental monitoring device 110 is deployed near a road on which the vehicle 130 travels. The environmental monitoring devices 110 have a communication connection with corresponding sensing devices 107-1, 107-2 (collectively referred to as a sensing device 107). The sensing device 107 is independent of the vehicle 130, and is configured to monitor the condition of the environment 100 to obtain sensing information related to the environment 100. The sensing information acquired by the sensing device 107 disposed corresponding to the road 102 may also be referred to as roadside sensing information. The sensing information acquired by the sensing device 107 may be provided to the environmental monitoring device 110. The environmental monitoring device 110 may also be deployed on the roadside, as a roadside device. Although illustrated as independent devices, in some implementations, the sensing device 107 may also be partially or fully integrated with the environmental monitoring device 110.

The sensing device 107 may be arranged at certain intervals for monitoring a geographical range of the environment 100. In some examples, in addition to fixing the sensing devices 107 at a position, a movable sensing device 107 such as a movable sensing site may be provided. The sensing range of the sensing device 107 is limited due to the sensing capabilities. FIG. 1 schematically illustrates the geographical ranges 102-1 and 102-2 (collectively referred to as a geographical range 102) that are perceptible by the sensing devices 107-1 and 107-2, respectively. Objects or phenomena occurring within the perceptible geographical range 102 can be sensed by the sensing device 107. In some cases, the geographical ranges sensed by adjacently deployed sensing devices 107 may have partial overlap.

In order to monitor the environment 100 in all directions, the sensing device 107 may be disposed near the road on which the vehicle travels. The sensing device 107 may also be disposed at a preset height according to needs, such as being fixed at a certain height by a support rod. The sensing device 107 may include one or more sensor units, which may be of the same or different types, and may be distributed at the same or different positions in the geographical range 102.

Examples of the sensor unit in the sensing device 107 may include, but are not limited to, an image sensor (e.g., a camera), a laser radar, a millimeter wave radar, an infrared sensor, a positioning sensor, an illumination sensor, a pressure sensor, a temperature sensor, a humidity sensor, a wind speed sensor, a wind direction sensor, and an air quality sensor. The image sensor may be configured to acquire image information. The laser radar and the millimeter wave radar may be configured to acquire laser point cloud data. The infrared sensor may be configured to detect the environment condition by using infrared. The positioning sensor may be configured to acquire position information of the object. The illumination sensor may be configured to acquire values indicating the illumination intensity in the environment. The pressure sensor, the temperature sensor and the humidity sensor may be configured to acquire values indicating the pressure, the temperature and the humidity, respectively. The wind speed sensor and the wind direction sensor may be configured to acquire values indicating the wind speed and the wind direction, respectively. The air quality sensor may be configured to acquire indicators related to air quality, such as oxygen concentration, carbon dioxide concentration, dust concentration, and pollutant concentration in the air. Only few examples of the sensor units are listed above, and other types of sensors may be employed according to needs.

The environment 100 may include a computing device 120. The computing device 120 may be remotely or locally located, and have a communication connection with the one or more environmental monitoring devices 110 in environment 100. In the present disclosure, the computing device 120 is configured to provide a danger warning for the vehicle 130. The computing device 120 may communicate with the environmental monitoring device 110 through wired and/or wireless connection based on any communication technology. The computing device 120 may be any device, node, unit, or the like having computing capabilities. As an example, the computing device 120 may be a general-purpose computer, a server, a large-scale server machine, a network node such as an edge computing node, a cloud computing device such as a virtual machine (VM), and any other device having computing capabilities.

The environmental monitoring device 110 may receive sensing information from the sensing device 107, and process the received sensing information. In some implementations, the environmental monitoring device 110 may communicate with the vehicle 130, and receive sensing information from the vehicle 130 having the sensing capability. Generally, the environmental monitoring device 110 on the roadside may also have a computing capability, since the received sensing information is merely related to the limited geographical range, the size of the geographical range is limited by the sensing capability of the sensing device 107. In some embodiments, the computing device 120 may process the sensing data related to the plurality of geographical ranges monitored by the sensing device, thereby effectively identifying whether the object in a wider geographical range will threaten the safe driving of the vehicle 130.

The facilities and objects illustrated in FIG. 1 are merely examples. The type, the number and the relative arrangement of the objects in different environments may vary, the present disclosure is not limited in the respect. For example, there may be more environmental monitoring devices and sensing devices deployed on the roadside in the environment 100 for monitoring additional geographical positions. Although shown as an independent device, in an alternative implementation, the computing device 120 may be an environmental monitoring device with high computing capabilities deployed on the roadside, which can process the sensing data of the corresponding geographical range, and can also determine the danger warning for the vehicle in combination with sensing data provided by other environmental monitoring devices.

Figure 2:
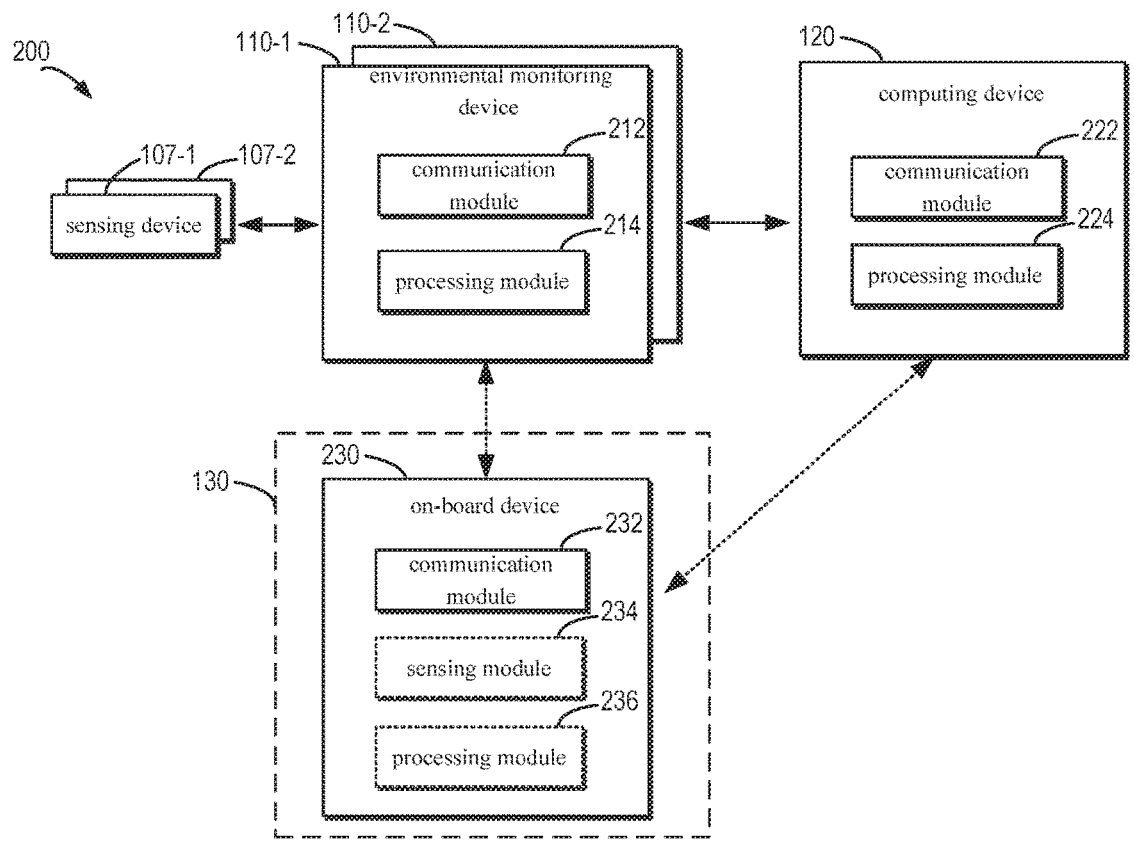
FIG. 2 is a schematic diagram of a coordinated danger warning system according to an embodiment of the present disclosure.

FIG. 2 illustrates a coordinated danger warning system 200 formed by devices involved in a danger warning process for a vehicle. The system 200 includes a plurality of sensing devices (e.g., the sensing devices 107-1 and 107-2 shown in FIG. 1), a plurality of environmental monitoring devices 110 (e.g., the sensing devices 110-1 and 110-2 shown in FIG. 1), a computing device 120, and an on-board device 230. The on-board device 230 may be within a vehicle 130, and is configured to obtain danger warning for the vehicle 130. The on-board device 230 may be integrated into the vehicle 130 or may be removed from the vehicle 130. For example, the on-board device 230 may be carried into the vehicle 130 by a driver or passenger. Although only one on-board device 230 is shown, the system 200 may include a plurality of on-board devices 230 located on a plurality of vehicles 130. The computing device 120 can provide danger warning for the plurality of vehicles 130.

The environmental monitoring device 110 may be configured to monitor the preset geographical range, for example, the environmental monitoring device 110 may sense the preset geographical range 102 based on the sensing device 107 to obtain sensing data related to the geographical range. Each environment monitoring device 110 may include a communication module 212, and a processing module 214. The communication module 212 is configured to receive raw sensing information from the corresponding sensing device 107. In some implementations, the communication module 212 of the environmental monitoring device 10 may also receive sensing information from the one or more of the vehicles 130.

The processing module 214 is configured to process raw sensing information. Specifically, the processing module 214 may be configured to, based on the raw sensing information, identify objects that may appear in the geographical range 102 perceptible by the sensing device 107, and determine information related to the identified objects. When the sensing device 107 provides different types of sensing information acquired by different types of sensors and/or sensing information acquired at multiple time points, the processing module 214 may perform data fusion on the sensing information by using data fusion technology.

After processing, the processing module 214 may determine a sensing data set, which may include relevant information about objects in the corresponding geographical range 102. The object may include any type of dynamic and/or static physical entity appearing in the geographical range 102, including the vehicle 130 and/or the object 105 external to the vehicles 130. For example, for the environmental monitoring device 110-1, the determined sensing data set may include vehicles 130-1 and 130-2, person 105-2, and stone 105-1 in the geographical range 102-1. For the environmental monitoring device 110-2, the determined sensing data set may include vehicles 130-2 and 130-3, and person 105-3 in the geographical range 102-2. The relevant information may include one or more of a type, a size, and a position (e.g., a central position for a large-sized object) of the sensed one or more objects. Alternatively, the relevant information may also include a motion direction of the object, and a distance from the object to a viewpoint, and the like. For each object, the sensing data set may include a corresponding n-tuple to describe the object, and the n-tuple may indicate various types of information of the object.

The environmental monitoring devices 110 may transmit the sensing data set to the computing device 120 via the communication module 212. In some embodiments, when the bandwidth of the communication connection is enough and/or the computing capability of the computing device 120 is strong, the environmental monitoring device 110 may transmit the raw sensing information received from the sensing device 107 to the computing device 120 without processing the data locally. The computing device 120 may process such raw sensing information to determine information such as the type, size, and position of the object.

Each of the plurality of environmental monitoring devices 110 may provide a sensing data set to the computing device 120. The computing device 120 may include a communication module 222 and a processing module 224. The communication module 222 is configured to receive a plurality of sensing data sets from the plurality of computing monitoring devices 110. The processing module 224 is configured to determine, based on the plurality of sensing data sets received, whether the objects in the corresponding plurality of geographical ranges will threaten the driving safety of the vehicle 130, and provide a danger warning to the vehicle 130 in response to determining that there is the danger. The computing device 120 may determine the driving safety threat of one, some, or all of the vehicles 130 in the environment 100. In some embodiments, to make the danger warning work, only the vehicles 130 having a direct communication connection or an indirect communication connection via other devices (e.g., the environmental monitoring device 110) with the computing device 120 are provided with the danger warning.

An object that may threaten the driving safety of the vehicle 130 may have a probability of colliding with the vehicle 130, the object is also referred to as an obstacle or potentially dangerous object of the vehicle 130, example of the object may include other vehicles, people, animals, and/or other dynamic or static objects. By comprehensively considering the sensing data of the plurality of geographical ranges 102, the processing module 224 can determine the objects that may threaten the driving safety of the vehicle 130 in a wider range without being limited by the sensing range of the sensing device. The vehicle 130 being provided with the danger warning may be located within the plurality of geographical ranges 102 (as shown in FIG. 1) or may be located near the plurality of geographical ranges 102.

In an embodiment, the processing module 224 may determine a danger degree of each of the one or more objects in the geographical ranges 102 to the vehicle 130 based on the received plurality of sensing data sets. The danger degree is configured to indicate a possibility that the object will endanger safe driving of the vehicle. The processing module 224 may determine whether to provide the danger warning to the vehicle 130 based on the danger degree.

The amount of data to be processed may be large due to the sensing data of the plurality of geographical ranges is considered. The processing module 224 may adopt a data de-redundancy method to reduce the calculation amount and improve the calculation efficiency. In some embodiments, the geographical ranges monitored by different environmental monitoring devices 110 may partially overlap, resulting in that the sensing data sets provided by different environmental monitoring devices 110 may include relevant information about objects appearing in overlapping geographical regions. The processing module 224 may perform de-redundancy on the recurrence information. For example, the processing module 224 may determine geographic ranges that are at least partially overlapping from the plurality of geographical ranges 102, when it is determined that two or more geographical ranges have overlapping regions, the processing module 224 may perform de-redundancy on the sensing data sets indicating these geographical ranges. In some implementations, the processing module 224 may similarly perform de-redundancy on the plurality of sensing data sets received.

The processing module 224 may determine sensing data sets including relevant information of the same object from the sensing data sets to be de-redundant, when it is determined that two or more sensing data sets include relevant information of the same one object or more objects, the processing module 224 may keep the relevant information of the object in only one sensing data set, and delete the relevant information of the object from the remaining sensing data sets. Thus, the amount of data for determining the danger degree can be reduced.

In determining whether different sensing data sets include relevant information of the same object, the processing module 224 may determine whether the objects indicated by two sensing data sets are the same based on determination of whether relevant information of an object in a sensing data set is the same as or similar to relevant information of an object in the other sensing data set. For example, the processing module 224 may determine whether the types of the objects are the same, whether the difference of the sizes of the objects is within a threshold range, whether the difference of the positions of the objects is within a distance difference range, or whether the directions of the objects are consistent. When all or more of the determination results are yes, the processing module 224 may determine that the objects indicated by the two sensing data sets are the same object. The processing module 224 may perform the corresponding determination on each object indicated by the two sensing data sets. In addition, the processing module 224 may perform the determination on each of the sensing data sets to be de-redundant, to determine whether more sensing data sets include the information of the object. In the example of FIG. 1, the sensing data sets provided by the environmental monitoring devices 110-1 and 110-2 include relevant information of the vehicle 130-2, the information can be removed from one of the two sensing data sets to reduce data redundancy.

In some embodiments, the processing module 224 may further filter the sensing data to be used for determining the danger warning for the vehicle 130 to increase efficiency. The object that may threaten the driving safety of the vehicle 130, such as the object that may cause a collision with the vehicle 130, may be located near the vehicle 130, and an object away from the vehicle may have a lower danger degree in a short time. The processing module 224 may identify objects within a distance threshold to the vehicle 130 from the plurality of sensing data sets, for example, the processing module 224 may identify objects within the distance threshold to the vehicle 130 from the de-redundant sensing data sets. The de-redundant sensing data set may be a sensing data set obtained by performing de-redundancy on the sensing data sets. The distance threshold may be set to be less than a safe distance to the vehicle 130, and may be determined based on factors such as the speed of the vehicle 130, and the road environment (e.g., the highway, the urban road, or the township road). For example, the processing module 224 may identify objects within 200 meters to the vehicle 130 from the sensing data sets. For an object with a large volume, the distance from the object to the vehicle 130 may be determined based on the distance from a geometric center of the object to the vehicle 130. After filtering by distance, the processing module 224 may determine the danger degree of respective object with respect to the vehicle 130 based on relevant information about the objects within the preset distance range.

Alternatively, the processing module 224 may classify the plurality of sensing data sets, especially the de-redundant and/or distance-filtered sensing data sets, based on a speed of the object and/or a relative orientation of the object and the vehicle 130. For example, based on the speed of the object, the processing module 224 may classify the data in the sensing data set into a static object data category and a dynamic object data category, the static object data category includes relevant information about objects with low or zero speeds, and the dynamic object data category includes relevant information about object with relative high speeds, such as objects moving significantly.

Furthermore, based on the relative orientation between the object and the vehicle 130, the dynamic object data category may be classified into at least one of a forward same-direction motion data category, a forward reverse-direction motion data category, a rear same-direction motion data category, and a rear reverse-direction motion data category. The forward same-direction motion data category may include relevant information about objects that are ahead of the vehicle 130 and travel in the same direction as the traveling direction of the vehicle 130. The forward reverse-direction motion data category may include relevant information about objects in front of the vehicle 130 and travel in a direction opposite to the traveling direction of the vehicle 130. The rear same-direction motion data category may include relevant information about objects behind the vehicle 130 and in the same direction as the traveling direction of the vehicle 130. The rear reverse-direction motion data category may include relevant information about objects behind the vehicle 130 and travel in a direction opposite to the traveling direction of the vehicle 130.

For different dangerous events that may occur, the danger degree may be determined based on a part of the data categories instead of all data categories, for example, the danger degree of the object may first be determined based on a first data category having a high priority, and then be determined based on a second data category having a low priority when no danger warning is determined. Thus, the amount of data that needs to be considered for determining the danger degree can be reduced, and the efficiency of determining the occurrence of the dangerous events can be improved. For a predetermined dangerous event, the processing module 224 may determine a priority of each of the plurality of data categories, and then determine a possibility that respective object in the plurality of geographical ranges triggers the predetermined dangerous event with each of the plurality of data categories according to an order of the priorities, so as to generate the danger degree of the object.

In terms of driving safety, the dangerous events may include collision, the vehicle 130 may collide with the object in its traveling direction, for example, the vehicle 130 may collide with other vehicles or other types of objects in the same lane of the vehicle 130. For such dangerous event, the processing module 224 may determine the danger degree of the object preferentially based on the forward same-direction motion data category. The order of priorities of the data categories may be, for example, the forward same-direction motion data category, the forward reverse-direction motion data category, the static object data category, the rear same-direction motion data category, and the rear reverse-direction motion data category.

The dangerous events may also include a blind-zone dangerous event, indicating that the vehicle or the object in the blind zone of the vehicle 130, such as the vehicle or the object traveling in the same direction on the adjacent lane of vehicle 130, may threaten the driving safety of the vehicle 130. For the blind-zone dangerous event, the rear same-direction motion data category may have a high priority, for this data category may be more likely to include the object that may cause the blind-zone dangerous event, and the priorities of other data categories may be configured accordingly. In an embodiment, the dangerous event may also include an overtaking dangerous event, indicating a danger that the vehicle 130 may collide with an object (or a moving vehicle) in a contraflow lane, when the vehicle 130 overtakes other vehicles in the contraflow lane. For the contraflow overtaking dangerous event, the forward reverse-direction motion data category may have a high priority, the priorities of other data categories may be configured accordingly.

The dangerous events may further include, for example, a left-turn collision dangerous event (for example, a collision occurred when the vehicle turns left), an intersection collision dangerous event (for example, a collision occurred in an intersection), and an emergency braking dangerous event (for example, a collision occurred when the vehicle in front brakes suddenly). For these dangerous events, the data category most likely to include the object that may cause the dangerous event may be set to a high priority. The above dangerous events are merely examples, there may be other dangerous events, in the present disclosure is not limited, the priorities of the data categories may set accordingly.

In some embodiments, the danger degree of the object may be divided into two levels, for example, a first level that poses a threat to the driving safety of the vehicle 130 and a second level that does not pose a threat. In an embodiment, the danger degree may be indicated by a numerical value, to accurately indicate the possibility of the object will endanger the driving safety of the vehicle 130. The processing module 224 may compare the danger degree to a degree threshold. The degree threshold may be configured to screen out objects that are likely to endanger the driving safety of the vehicle 130, and the degree threshold may be determined according to classification of the danger degree or the actual danger warning requirements.

The processing module 224 may determine a danger degree of each of a plurality of objects with respect to the vehicle 130, when the degree threshold is greater than the degree threshold, the processing module 224 may provide a danger warning instruction to the vehicle 130. The danger warning instruction may be any form of information for informing the driver of the potential danger, to cause the driver to take corresponding measures. When the automatic driving capability of the vehicle 130 is low (for example, less than a capability threshold) or the vehicle 130 does not have the automatic driving capability, potential danger warning will be helpful. In an embodiment, the danger warning instruction may be presented to the driver of the vehicle, for example, by playing a sound via an acoustic device on the vehicle 130, by presenting the instruction via a display, by instructing via an indicator, etc. In an embodiment, when the automatic driving capability of the vehicle is greater than or equal to the capability threshold, for example, the vehicle can drive automatically without operation of driver in some operations, the danger warning instruction may be provided to a controller (such as an autonomous driving system) to assist in driving control of the vehicle. In some embodiments, the danger warning instruction may also be configured to indicate the predetermined dangerous event, such as the collision dangerous event, and the blind-zone dangerous event, such that the driver or the automatic driving system can quickly identify the danger to take next action.

When there is a communication connection between the computing device 120 and the on-board device 230, the danger warning instruction may be provided to the on-board device 230 through the communication module 222. When there is no communication connection between the computing device 120 and the on-board device 230, the computing device 120 may forward the danger warning instruction to the on-board device 230 via other devices. The environmental monitoring device 110 deployed on the roadside may have a communication connection with the on-board device 230, the computing device 120 may forward the danger warning instruction to the on-board device 230 through the environmental monitoring device 110. The computing device 120 may transmit the danger warning instruction to the environmental monitoring device 110, to instruct the environmental monitoring device 110 to forward the danger warning to the on-board device 230.

There may be a plurality of candidate environmental monitoring devices 110 on the road side that have the communication connection with the on-board device 230, the computing device 120 (or the processing module 224) may select an environmental monitoring device 110 from the plurality of candidate environmental monitoring devices for forwarding the danger warning instruction. The processing module 224 may randomly select the environmental monitoring device 110, or select the environmental monitoring device 110 having a high forwarding efficiency or a high forwarding success rate. The plurality of candidate environmental monitoring devices 110 may be environmental monitoring devices for providing sensing data of a plurality of geographical ranges, and/or environmental monitoring devices that monitor other geographical ranges.

In an embodiment, the processing module 224 may select the environmental monitoring device 110 for forwarding the danger warning instruction based on the distance between each of the plurality of candidate environmental monitoring devices and the vehicle 130 to which the danger warning instruction is to be transmitted, for example, the environmental monitoring device 110 near (for example, the distance to the vehicle 130 being less than a threshold) or closest to the vehicle 130 may be selected. Alternatively, or additionally, the processing module 224 may select the environmental monitoring device 110 based on whether the plurality of candidate environmental monitoring devices 100 are located in the traveling direction of the vehicle 130, for example, the processing module 224 may select the environmental monitoring module 110 in the forward direction of the vehicle 130. Moreover, the distance and the positioning relationship may be both considered, for example, in the case of the same distance, the environmental monitoring device located in the driving direction may be selected.

Figure 3:
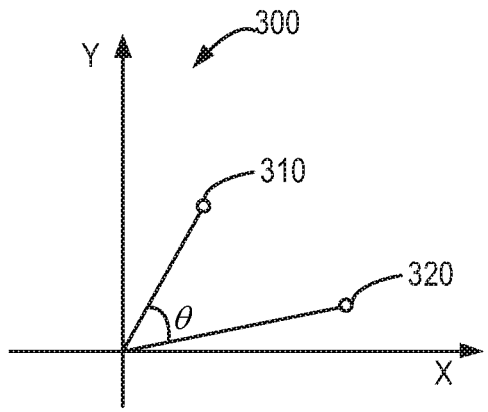
FIG. 3 is a schematic diagram illustrating a positional relationship between an environmental monitoring device and a computing device in a coordinate system according to an embodiment of the present disclosure.

In some embodiments, the processing module 224 may select the environmental monitoring device 110 for forwarding the danger warning instruction based on an angle between the position of each of the plurality of candidate environmental monitoring devices 110 and the position of the vehicle 130 in the same coordinate system. For example, when there are still a plurality of candidate environmental monitoring devices 110 after screening according to the distance and positioning relationship, the processing module 224 may consider the angle. FIG. 3 illustrates a positional relationship between a candidate environmental monitoring device 110 and the vehicle 130 in the coordinate system 300. In the coordinate system 300, the coordinate point 310 corresponds to the position of the candidate environmental monitoring device 110, and the coordinate point 320 corresponds to the position of the vehicle 130. The angle θ between the coordinate points 310 and 320 may be configured to select environmental monitoring device 110. For example, the processing module 224 may select the environmental monitoring device 110 corresponding to the smaller angle or the smallest angle.

With reference to FIG. 2, which further illustrates the structure of the on-board device 230 on the vehicle 130. The on-board device 230 may include a communication module 232, configured to enable the vehicle 130 to communicate with external devices. The on-board device 230 may communicate with the environmental monitoring device 110 and/or the computing device 120 to receive the danger warning instruction.

In at least one embodiment, the on-board device 230 may include a sensing module 234, configured to collect sensing information of the surrounding environment of the vehicle 130. The sensing module 234 may include one or more types of sensor units. In addition, the on-board device 230 may also include a processing module 236. For example, the processing module 236 may process the sensing information acquired by the sensing module 234, and/or determine the next action that the vehicle 130 should take based on the danger warning instruction received. In an embodiment, the sensing module 234 and the processing module 236 may not be included in the on-board device 230 of all vehicles 130.

Figure 4:
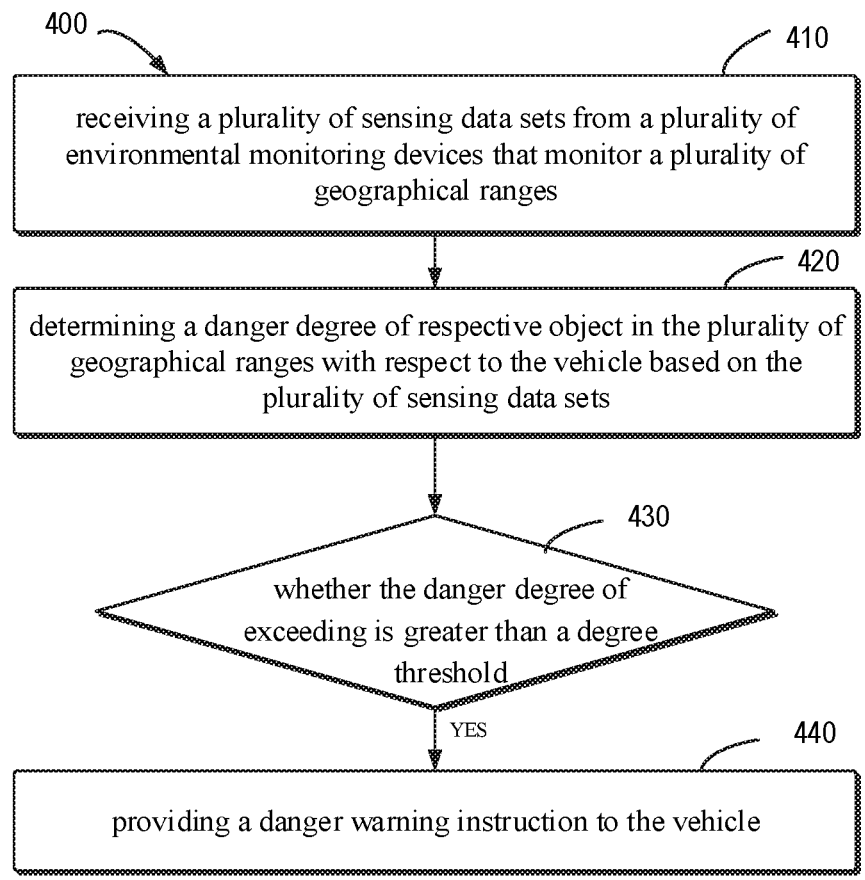
FIG. 4 is a flowchart of a danger warning method for a vehicle according to an embodiment of the present disclosure.

FIG. 4 is a flowchart of a danger warning method 400 for a vehicle according to an embodiment of the present disclosure. The method 400 may be implemented by the computing device 120 in FIG. 1 and FIG. 2.

At block 410, a plurality of sensing data sets are received from a plurality of environmental monitoring devices that monitor a plurality of geographical ranges.

Each of the plurality of sensing data sets includes relevant information about objects in the corresponding geographical range, and the plurality of environmental monitoring devices are arranged away from the vehicle.

At block 420, a danger degree of respective object in the plurality of geographical ranges with respect to the vehicle is determined based on the plurality of sensing data sets.

The danger degree is configured to indicate a possibility that the object will endanger safe driving of the vehicle.

At block 430, it is determined whether the danger degree is greater than a degree threshold.

At block 440, a danger warning instruction is provided to the vehicle in response to determining that the danger degree is greater than the degree threshold.

In some embodiments, determining the danger degree includes acts of: performing de-redundancy on the plurality of sensing data sets; and determining the danger degree based on a plurality of de-redundant sensing data sets. In an embodiment, performing de-redundancy on the plurality of sensing data sets includes acts of: determining that at least two of the plurality of sensing data sets include relevant information about the same object; and keeping the relevant information about the same object in one of the at least two sensing data sets, and deleting the relevant information about the same object from remaining sensing data sets.

In some embodiments, performing de-redundancy includes acts of: determining that at least two of the plurality of geographical ranges monitored by the plurality of environmental monitoring devices are at least partially overlapping; and performing de-redundancy on the at least two sensing data sets including relevant information about objects in the at least two geographical ranges.

In some embodiments, determining the danger degree includes acts of: identifying an object within a distance threshold to the vehicle from the plurality of sensing data sets; and determining the danger degree of the object based on the relevant information about the object identified.

In some embodiments, determining the danger degree includes acts of: classifying the plurality of sensing data sets into a plurality of data categories based on at least one of a speed of the object and a relative orientation of the object and the vehicle; for a predetermined dangerous event, determining a priority of each of the plurality of data categories; and determining a possibility that respective object in the plurality of geographical ranges triggers the predetermined dangerous event with each of the plurality of data categories according to an order of the priorities, to generate the danger degree of the object.

In some embodiments, providing the danger warning includes acts of: transmitting the danger warning instruction to an on-board device via a communication connection with the on-board device of the vehicle.

In some embodiments, providing the danger warning includes acts of: selecting an environmental monitoring device from a plurality of candidate environmental monitoring devices, each of the plurality of candidate environmental monitoring devices having a communication connection with an on-board device of the vehicle; and transmitting the danger warning instruction to the selected environmental monitoring device, to instruct the selected environmental monitoring device to forward the danger warning instruction to the on-board device. In an embodiment, selecting the environmental monitoring device from the plurality of candidate environmental monitoring devices is based on at least one of: a distance between each of the plurality of candidate environmental monitoring devices and the vehicle; whether the plurality of candidate environmental monitoring devices are located in a traveling direction of the vehicle; and an angle between a position of each of the plurality of candidate environmental monitoring devices and a position of the vehicle in a coordinate system.

In some embodiments, each of the plurality of sensing data sets includes at least one of a type, a size, a position, a speed, and a motion direction of the object in the geographical range.

In some embodiments, providing the danger warning instruction to the vehicle in response to determining that the danger degree is greater than the threshold includes acts of: presenting the danger warning instruction to a driver of the vehicle when an automatic driving capability of the vehicle is less than a capability threshold; providing the danger warning instruction to a controller to assist in driving control of the vehicle when the automatic driving capability of the vehicle is greater than or equal to the capability threshold.

Figure 5:
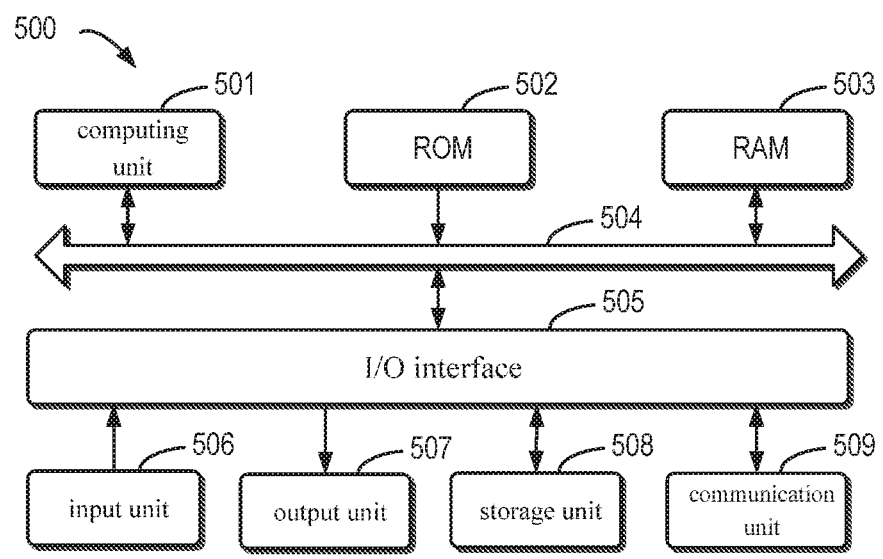
FIG. 5 is a block diagram of a device capable of implementing an embodiment of the present disclosure.

FIG. 5 is a block diagram of an exemplary device 500 capable of implementing an embodiment of the present disclosure. The device 500 may be configured to implement the computing device 120 or the environmental monitoring device 110 In FIG. 1 and FIG. 2. The device 500 includes a computing unit 501, which may be configured to perform various appropriate operations and processes based on computer program instructions stored in a ROM 502 or computer program instructions loaded from a storage unit 508 into a RAM 503. The RAM 503 may store various programs and data required for operations of the device 500. The CPU 501, the ROM 502 and the RAM 503 may be connected to each other through a bus 504. The input/output (I/O) interface 505 may also be coupled to the bus 504.

A plurality of components in the device 500 are coupled to the I/O interface 505, including: an input unit 506 such as a keyboard, a mouse, etc., an output unit 507 such as various types of displays, speakers, etc., a storage unit 508 such as a disk, an optical disk or the like, and a communication unit 509 such as a network card, a modem, a wireless communication transceiver, or the like. The communication unit 509 allows the device 500 to exchange information/data with other devices over a computer network such as Internet and/or various telecommunication networks.

The computing unit 501 may include a variety of general purpose and/or special processing components with processing and computing capabilities. Examples of the computing unit 501 may include, but are not limited to, a central processing unit (CPU), a graphic processing unit (GPU), various specialized artificial intelligence (AI) computing chips, various computing units for running machine learning model algorithms, a digital signal processor (DSP), and any suitable processor, controller, microcontroller. The computing unit 501 can perform various methods and processes described above, such as the method 400. For example, in some embodiments, the method 400 may be implemented as a computer software program that is tangibly embodied in a machine readable medium, such as the storage unit 508. In some embodiments, some or all of the computer program may be loaded and/or installed on the device 500 via ROM 502 and/or the communication unit 509. One or more steps of the method 400 described above may be performed when the computer program is loaded into RAM 503 and executed by the computing unit 501. Alternatively, in other embodiments, the computing unit 501 may be configured to perform the method 400 by any other suitable means (e.g., by means of firmware).

The functions described above may be performed, at least in part, by one or more hardware logic components. For example, without any limitation, the exemplary type of the hardware logic component may include: Field Programmable Gate Array (FPGA), Application Specific Integrated Circuit (ASIC), Application Specific Standard Product (ASSP), System on Chip (SOC), Complex Programmable Logic Device (CPLD), etc.

The program code for implementing the method of the present disclosure may be written in any combination of one or more programming languages. The program code may be provided to a general-purpose computer, a special purpose computer or a processor or controller of other programmable data processing devices, such that the program code, when executed by the processor or controller, causes the functions/operations specified in the flowcharts and/or block diagrams to be implemented. The program code may be executed entirely on a machine, partially on a machine, partially on the machine as a separate package, partially on a remote machine, or entirely on a remote machine or server.

In the context of the present disclosure, a machine-readable medium may be a tangible medium that may contain or store programs for use by or in combination with an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor system, apparatus or device, or any suitable combination of the above. More specific examples of the machine-readable storage medium may include electrical connections based on one or more wires, a portable computer disk, a hard disk, a random access memory (RAM), a read-only memory (ROM), an erasable programmable read-only memory (EPROM or Flash memory), an optical fiber, a compact disk-only memory (CD-ROM), an optical storage device, a magnetic storage device, or any suitable combination of the above.

In addition, although the operations are depicted in a particular order, such operations are required to be performed in the particular order shown or in the order, or that all illustrated operations should be performed to achieve the desired results. Multitasking and parallel processing may be advantageous in certain circumstances. Likewise, although several specific implementation details are included in the above discussion, these should not be construed as restrictions on the scope of the present disclosure. Certain features described in the context of individual embodiments may also be implemented in combination in a single implementation. Instead, various features described in the context of a single implementation may also be implemented in a plurality of implementations, either individually or in any suitable subcombination.

Although the present disclosure has been described in language specific to structural features and/or methodological acts, it is understood that the subject matter defined in the appended claims is not limited to the specific features or acts described. Instead, the specific features and acts described above are merely exemplary forms of implementing the claims.

What is claimed is:

1. A danger warning method for a vehicle, comprising:
   receiving a plurality of sensing data sets from a plurality of environmental monitoring devices that monitor a plurality of geographical ranges, each of the plurality of sensing data sets comprising relevant information about objects in the corresponding geographical range, and the plurality of environmental monitoring devices being arranged away from the vehicle;
   determining a danger degree of respective object in the plurality of geographical ranges with respect to the vehicle based on the plurality of sensing data sets, the danger degree being configured to indicate a possibility that the object will endanger safe driving of the vehicle; and
   providing a danger warning instruction to the vehicle in response to determining that the danger degree is greater than a degree threshold;
   wherein determining the danger degree comprises:
   performing de-redundancy on the plurality of sensing data sets; and
   determining the danger degree based on a plurality of de-redundant sensing data sets;
   wherein performing de-redundancy on the plurality of sensing data sets comprises:
   determining that at least two of the plurality of sensing data sets comprise relevant information about the same object; and
   keeping the relevant information about the same object in one of the at least two sensing data sets, and deleting the relevant information about the same object from remaining sensing data sets.

2. The method according to claim 1, wherein performing de-redundancy comprises:
   determining that at least two of the plurality of geographical ranges monitored by the plurality of environmental monitoring devices are at least partially overlapping; and
   performing de-redundancy on the at least two sensing data sets comprising relevant information about objects in the at least two geographical ranges.

3. The method according to claim 1, wherein determining the danger degree comprises:
   identifying an object within a distance threshold to the vehicle from the plurality of sensing data sets; and
   determining the danger degree of the object based on the relevant information about the object identified.

4. The method according to claim 1, wherein determining the danger degree comprises:
   classifying the plurality of sensing data sets into a plurality of data categories based on at least one of a speed of the object and a relative orientation of the object and the vehicle;
   for a predetermined dangerous event, determining a priority of each of the plurality of data categories; and
   determining a possibility that respective object in the plurality of geographical ranges triggers the predetermined dangerous event with each of the plurality of data categories according to an order of the priorities, to generate the danger degree of the object.

5. The method according to claim 1, wherein providing the danger warning comprises:
   transmitting the danger warning instruction to an on-board device via a communication connection with the on-board device of the vehicle.

6. The method according to claim 1, wherein providing the danger warning comprises:
   selecting an environmental monitoring device from a plurality of candidate environmental monitoring devices, each of the plurality of candidate environmental monitoring devices having a communication connection with an on-board device of the vehicle; and
   transmitting the danger warning instruction to the selected environmental monitoring device, to instruct the selected environmental monitoring device to forward the danger warning instruction to the on-board device,
   wherein selecting the environmental monitoring device from the plurality of candidate environmental monitoring devices is based on at least one of:
   a distance between each of the plurality of candidate environmental monitoring devices and the vehicle;
   whether the plurality of candidate environmental monitoring devices are located in a traveling direction of the vehicle; and
   an angle between a position of each of the plurality of candidate environmental monitoring devices and a position of the vehicle in a coordinate system.

7. The method according to claim 1, wherein each of the plurality of sensing data sets comprises at least one of a type, a size, a position, a speed, and a motion direction of the object in the geographical range.

8. The method according to claim 1, wherein providing the danger warning instruction to the vehicle in response to determining that the danger degree is greater than the threshold comprises:
   presenting the danger warning instruction to a driver of the vehicle, when an automatic driving capability of the vehicle is less than a capability threshold;
   providing the danger warning instruction to a controller to assist in driving control of the vehicle, when the automatic driving capability of the vehicle is greater than or equal to the capability threshold.

9. A danger warning device for a vehicle, comprising:
   one or more processors; and a storage device configured to store one or more programs, wherein when the one or more programs are executed by the one or more processors, the one or more processors are caused to:

receive a plurality of sensing data sets from a plurality of environmental monitoring devices that monitor a plurality of geographical ranges, each of the plurality of sensing data sets comprising relevant information about objects in the corresponding geographical range, and the plurality of environmental monitoring devices being arranged away from the vehicle;

determine a danger degree of respective object in the plurality of geographical ranges with respect to the vehicle based on the plurality of sensing data sets, the danger degree being configured to indicate a possibility that the object will endanger safe driving of the vehicle; and provide a danger warning instruction to the vehicle in response to determining that the danger degree is greater than a degree threshold;

wherein the one or more processors are configured to:

perform de-redundancy on the plurality of sensing data sets; and determine the danger degree based on a plurality of de-redundant sensing data sets;

wherein the one or more processors are configured to perform de-redundancy on the plurality of sensing data sets by acts of:

determining that at least two of the plurality of sensing data sets comprise relevant information about the same object; and keeping the relevant information about the same object in one of the at least two sensing data sets, and deleting the relevant information about the same object from remaining sensing data sets.

10. The device according to claim 9, wherein the one or more processors are configured to:

determine that at least two of the plurality of geographical ranges monitored by the plurality of environmental monitoring devices are at least partially overlapping; and perform de-redundancy on the at least two sensing data sets comprising relevant information about the object in the at least two geographical ranges.

11. The device according to claim 9, wherein the one or more processors are configured to:

identify an object within a distance threshold to the vehicle from the plurality of sensing data sets; and determine the danger degree of the object based on the relevant information about the object.

12. The device according to claim 9, wherein the one or more processors are configured to:

classify the plurality of sensing data sets into a plurality of data categories based on at least one of a speed of the object and a relative orientation of the object and the vehicle;

for a predetermined dangerous event, determine a priority of each of the plurality of data categories; and determine a possibility that respective object in the plurality of geographical ranges triggers the predetermined dangerous event with each of the plurality of data categories according to an order of the priorities, to generate the danger degree of the object.

13. The device according to claim 9, wherein the one or more processors are configured to:

transmit the danger warning instruction to an on-board device via a communication connection with the on-board device of the vehicle.

14. The device according to claim 9, wherein the one or more processors are configured to:

select an environmental monitoring device from a plurality of candidate environmental monitoring devices, each of the plurality of candidate environmental monitoring devices having a communication connection with an on-board device of the vehicle; and transmit the danger warning instruction to the selected environmental monitoring device, to cause the selected environmental monitoring device to forward the danger warning instruction to the on-board device, wherein the one or more processors are configured to select the environmental monitoring device from the plurality of candidate environmental monitoring devices based on at least one of:

a distance between each of the plurality of candidate environmental monitoring devices and the vehicle;

whether the plurality of candidate environmental monitoring devices are located in a traveling direction of the vehicle; and an angle between a position of each of the plurality of candidate environmental monitoring devices and a position of the vehicle in a coordinate system.

15. The device according to claim 9, wherein each of the plurality of sensing data sets comprises at least one of a type, a size, a position, a speed, and a motion direction of the object in the geographical range.

16. The device according to claim 9, wherein the one or more processors are configured to:

present the danger warning instruction to a driver of the vehicle, presenting the danger warning instruction to a driver of the vehicle;

provide the danger warning instruction to a controller to assist in driving control of the vehicle, when the automatic driving capability of the vehicle is greater than or equal to the capability threshold.

17. A non-transitory computer readable storage medium having a stored thereon computer program that, when executed by a processor, cause a danger warning method for a vehicle to be implemented, the method comprising:

receiving a plurality of sensing data sets from a plurality of environmental monitoring devices that monitor a plurality of geographical ranges, each of the plurality of sensing data sets comprising relevant information about objects in the corresponding geographical range, and the plurality of environmental monitoring devices being arranged away from the vehicle;

determining a danger degree of respective object in the plurality of geographical ranges with respect to the vehicle based on the plurality of sensing data sets, the danger degree being configured to indicate a possibility that the object will endanger safe driving of the vehicle; and providing a danger warning instruction to the vehicle in response to determining that the danger degree is greater than a degree threshold;

wherein determining the danger degree comprises:

performing de-redundancy on the plurality of sensing data sets; and determining the danger degree based on a plurality of de-redundant sensing data sets;

wherein performing de-redundancy on the plurality of sensing data sets comprises:

determining that at least two of the plurality of sensing data sets comprise relevant information about the same object; and keeping the relevant information about the same object in one of the at least two sensing data sets, and deleting the relevant information about the same object from remaining sensing data sets.

\* \* \* \* \*